United States Patent
Park et al.

(10) Patent No.: US 9,703,110 B2
(45) Date of Patent: Jul. 11, 2017

(54) OPTICAL SYSTEM AND IMAGE PROJECTION APPARATUS HAVING THE SAME

(71) Applicant: LG ELECTRONICS INC., Seoul (KR)

(72) Inventors: Jun Park, Seoul (KR); Sangok Yeo, Seoul (KR); Honglyeol Oh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 88 days.

(21) Appl. No.: 14/648,117

(22) PCT Filed: Dec. 23, 2013

(86) PCT No.: PCT/KR2013/012011
§ 371 (c)(1),
(2) Date: May 28, 2015

(87) PCT Pub. No.: WO2014/115971
PCT Pub. Date: Jul. 31, 2014

(65) Prior Publication Data
US 2015/0309323 A1    Oct. 29, 2015

(30) Foreign Application Priority Data

Jan. 22, 2013  (KR) ........................ 10-2013-0007141

(51) Int. Cl.
*G02B 27/26*     (2006.01)
*G03B 21/14*     (2006.01)
(Continued)

(52) U.S. Cl.
CPC ........... *G02B 27/26* (2013.01); *G02B 13/002* (2013.01); *G02B 13/16* (2013.01); *G02B 17/08* (2013.01);
(Continued)

(58) Field of Classification Search
CPC .. G02B 17/08; G02B 17/085; G02B 17/0896; G02B 27/26; G02B 27/0101;
(Continued)

(56) References Cited

U.S. PATENT DOCUMENTS 6,464,362 B1    10/2002  Sugawara et al.
2004/0130799 A1   7/2004  Kreitzer
(Continued)

FOREIGN PATENT DOCUMENTS

CN    101794063 A    8/2010
EP    1 806 612 A1   7/2007
(Continued)

*Primary Examiner* — Bao-Luan Le
(74) *Attorney, Agent, or Firm* — Birch, Stewart, Kolasch & Birch, LLP (57) ABSTRACT

An image projection apparatus includes a light source for emitting a light bundle, a display element forming an image by using the light bundle, and a projection system having: a lens unit refracting the light bundle so as to magnify and project the image and including first and second aspheric lenses, which are spaced from each other and change the refraction of the light bundle, and at least one spherical lens disposed between the first and second aspheric lenses; and a mirror for reflecting, toward the outside, the light bundle delivered by the lens unit.

19 Claims, 6 Drawing Sheets

(51) Int. Cl.
  *G02B 27/01* (2006.01)
  *G03B 21/28* (2006.01)
  *G02B 13/00* (2006.01)
  *G02B 13/16* (2006.01)
  *G02B 17/08* (2006.01)

(52) U.S. Cl.
  CPC ......... *G02B 27/0101* (2013.01); *G03B 21/14* (2013.01); *G03B 21/28* (2013.01); *G02B 2027/015* (2013.01); *G02B 2027/0134* (2013.01)

(58) Field of Classification Search
  CPC .......... G02B 2027/0134; G02B 13/002; G03B 21/28; G03B 21/147; G03B 21/142
  See application file for complete search history.

(56) References Cited

U.S. PATENT DOCUMENTS

| | | | |
|---|---|---|---|
| 2004/0233547 A1 | 11/2004 | Sugano | |
| 2007/0103604 A1* | 5/2007 | Yoshikawa | G03B 21/10 348/781 |
| 2007/0285780 A1* | 12/2007 | Imafuku | G02B 5/08 359/514 |
| 2008/0019019 A1 | 1/2008 | Kawakami et al. | |
| 2008/0068715 A1* | 3/2008 | Magarill | G03B 21/006 359/583 |
| 2008/0100927 A1 | 5/2008 | Hisada et al. | |
| 2008/0192336 A1* | 8/2008 | Ohzawa | G02B 17/08 359/364 |
| 2008/0259773 A1* | 10/2008 | Tada | G02B 1/10 369/112.23 |
| 2008/0312062 A1* | 12/2008 | Sasai | C03C 3/068 501/50 |
| 2009/0128780 A1* | 5/2009 | Schuck | G02B 26/008 353/20 |
| 2009/0141242 A1* | 6/2009 | Silverstein | G02B 27/0905 353/20 |
| 2009/0153752 A1* | 6/2009 | Silverstein | G02B 27/1026 348/750 |
| 2009/0225233 A1* | 9/2009 | Hirata | G03B 21/28 348/744 |
| 2010/0141856 A1* | 6/2010 | Schuck | G03B 35/26 349/9 |
| 2010/0171937 A1* | 7/2010 | Hirata | G02B 13/16 353/70 |
| 2010/0226006 A1* | 9/2010 | Bentley | G02B 5/3033 359/465 |
| 2010/0328561 A1* | 12/2010 | Schuck | G02B 17/045 349/9 |
| 2011/0026111 A1 | 2/2011 | Nagatoshi | |
| 2011/0075115 A1* | 3/2011 | Ono | G03B 21/28 353/98 |
| 2011/0176114 A1* | 7/2011 | Schuck, III | G02B 27/22 353/8 |
| 2011/0298993 A1* | 12/2011 | Hirata | B29D 11/00269 348/744 |
| 2011/0317282 A1* | 12/2011 | Kimura | G02B 13/04 359/716 |
| 2012/0120484 A1* | 5/2012 | Konuma | G02B 13/16 359/364 |
| 2012/0162753 A1 | 6/2012 | Tatsuno | |
| 2013/0107357 A1* | 5/2013 | Silverstein | G02B 7/028 359/364 |
| 2013/0107360 A1* | 5/2013 | Kurtz | G02B 1/00 359/434 |
| 2013/0114053 A1* | 5/2013 | Tatsuno | G03B 21/28 353/99 |
| 2013/0229635 A1* | 9/2013 | Lin | G02B 13/18 353/88 |
| 2014/0015991 A1* | 1/2014 | Yamada | H04N 5/2254 348/220.1 |
| 2014/0139698 A1* | 5/2014 | Fukuta | G02B 13/0045 348/220.1 |

FOREIGN PATENT DOCUMENTS

| | | |
|---|---|---|
| JP | 2003-156683 A | 5/2003 |
| JP | 4355381 B2 | 10/2009 |
| KR | 10-0248010 B1 | 4/2000 |
| KR | 10-2005-0091064 A | 9/2005 |
| KR | 10-2008-0009638 A | 1/2008 |

* cited by examiner

OPTICAL SYSTEM AND IMAGE PROJECTION APPARATUS HAVING THE SAME

BACKGROUND OF THE INVENTION

1. Technical Field

The present invention relates to an image projection apparatus capable of magnifying a generated image and projecting the image outside of the image projection apparatus.

2. Background Art

As the information age is drastically developed, the importance of a display device which implements a large screen is emphasized. As an example of the display device, there is an image projection apparatus for magnifying and projecting an image.

The image projection apparatus indicates an apparatus for implementing an image using light generated from a light source, and projecting the implemented image. A representative example of the image projection apparatus includes a projector, a projection television, etc.

Recently, various attempts are being made in a functional aspect of the image projection apparatus. One of such attempts is to implement an ultra short throw (UST) ratio optical system for projecting a large image to a screen from a position closely adjacent to the screen.

However, in the conventional optical system, it is difficult to shorten a distance between an image projection apparatus and a screen, and it is very difficult to implement a full HD picture quality. Further, for a full HD image, a large number of glass lenses (generally, more than 20) are used. Besides, an additional lens having transmittance is required so as to implement an image projection apparatus which outputs a stereoscopic image.

If the number of lenses included in the optical system is increased so as to project a large image, an entire size of the optical system may be increased.

SUMMARY OF THE INVENTION

Therefore, an object of the present invention is to provide an optical system having a compact structure and capable of enhancing durability.

To achieve these and other advantages and in accordance with the purpose of the present invention, as embodied and broadly described herein, there is provided an image projection apparatus, including: a light source configured to emit a light bundle; a display device configured to form an image using the light bundle; a projection system including a lens unit for refracting the light bundle so as to magnify and project the image, and a mirror for reflecting the light bundle delivered by the lens unit toward outside, wherein the lens unit includes: a first aspheric lens and a second aspheric lens spaced from each other, and configured to change a refraction degree of the light bundle; and at least one spherical lens disposed between the first and second aspheric lenses.

In an embodiment of the present invention, the lens unit may form a single stop, and the lens unit may be divided into a first region and a second region based on the stop. The first and second aspheric lenses may be included in the first region close to the mirror.

In an embodiment of the present invention, the lens unit may further include a third aspheric lens disposed at the second region.

In an embodiment of the present invention, the stop may be formed between the first and third aspheric lenses.

In an embodiment of the present invention, the third aspheric lens may be an aspheric convex lens having two surfaces of different curvatures.

In an embodiment of the present invention, the first and second aspheric lenses may be implemented as a meniscus lens that facing surfaces of the first and second aspheric lenses have curvatures of different directions.

In an embodiment of the present invention, the first and second aspheric lenses may be formed of a glass molding material.

In an embodiment of the present invention, the first and second aspheric lenses may have a polarization characteristic for polarizing the light bundle, and the image may correspond to a three-dimensional stereoscopic image.

In an embodiment of the present invention, the lens unit may further include a first spherical lens configured to emit the light bundle toward the mirror, and formed such that an emitting surface for emitting the light bundle is a spherical surface; and a second spherical lens formed to be bonded to one surface of the first spherical lens.

In an embodiment of the present invention, surfaces of the first and second spherical lenses, which are bonded to each other, may be formed as flat surfaces.

In an embodiment of the present invention, a diameter of the first and second aspheric lenses may be smaller than that of the first and second spherical lenses.

To achieve these and other advantages and in accordance with the purpose of the present invention, as embodied and broadly described herein, there is also provided an optical system, including: a lens unit configured to refract a light bundle so as to magnify and project a stereoscopic image; and a mirror configured to reflect light bundle delivered by the lens unit toward outside, wherein the lens unit includes: a first aspheric lens and a second aspheric lens spaced from each other, and formed of a glass molding material having a preset polarization characteristic for outputting the stereoscopic image; and at least one spherical lens disposed between the first and second aspheric lenses, and configured to refract the light bundle.

In an embodiment of the present invention, the lens unit may form a single stop, and the lens unit may further include a third aspheric lens spaced from the first aspheric lens in a state where the stop is disposed therebetween.

In the present invention, since the lens unit controls a refraction degree of the light bundle by having the aspheric lenses, the number of lenses of the lens unit can be reduced.

Secondly, since a three-dimensional (3D) stereoscopic image is output by using the aspheric lenses formed of a glass molding material and having a polarization characteristic, an additional lens for implementing a stereoscopic image is not required.

With such a configuration, the number of lenses of the image projection apparatus can be reduced, and the image projection apparatus can have a more compact structure.

DETAILED DESCRIPTION OF THE EMBODIMENTS

Unless differently defined, all the terms used herein with including technical or scientific terms have the same meaning as terms generally understood by those skilled in the art relating to the field of the present invention. Terms defined in a general dictionary should be understood so as to have the same meanings as contextual meanings of the related art. Unless definitely defined in the present invention, the terms are not interpreted as ideal or excessively formal meanings. Furthermore, when the technical terms used in the present invention are unsuitable technical terms that do not precisely express the techniques of the present invention, the unsuitable technical terms should be replaced by suitable technical terms that can be understood by those skilled in the art. The general terms used in the present invention should be interpreted based on the previous or next contexts, but should not be interpreted as an excessively narrowed meaning.

A singular expression includes a plural concept unless there is a contextually distinctive difference therebetween. In the present invention, a term of "include" or "have" should not be interpreted as if it absolutely includes a plurality of components or steps of the specification. Rather, the term of "include" or "have" may not include some components or some steps, or may further include additional components.

It will be understood that although the terms first, second, etc. may be used herein to describe various elements, these elements should not be limited by these terms. These terms are generally only used to distinguish one element from another. For instance, a first component may be referred to as a second component, and a second component may be also referred to as a first component within the scope of the present invention.

Description will now be given in detail of the exemplary embodiments, with reference to the accompanying drawings. For the sake of brief description with reference to the drawings, the same or equivalent components will be provided with the same reference numbers, and description thereof will not be repeated.

Figure 1:
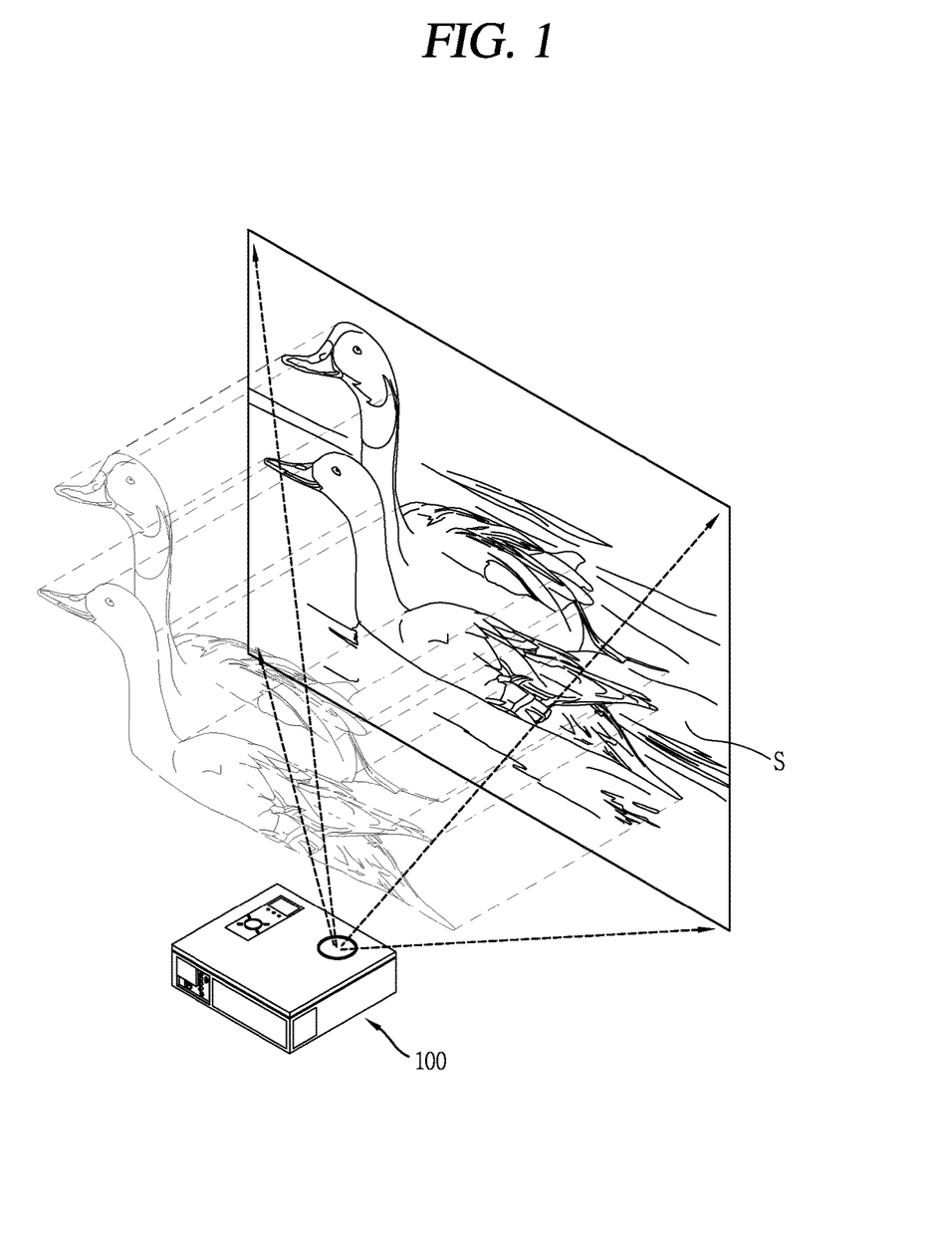
FIG. 1 is a conceptual view illustrating an operation of an image projection apparatus according to an embodiment of the present invention.

FIG. 1 is a conceptual view illustrating an operation of an image projection apparatus according to an embodiment of the present invention.

The image projection apparatus 100 according to the present invention is configured to project a large image onto a screen (S), in a state where it is arranged at a position closest to the screen (S).

The image projection apparatus 100 serves to implement an image using light generated from a light source, and to project the implemented image. As shown, the image projection apparatus may be implemented as a projector for magnifying and projecting an image, etc. Hereinafter, the image projection apparatus 100 according to the present invention will be explained with taking a projector as an example.

The image projection apparatus 100 may be implemented to change an output mode according to a user's setting, and to output a three-dimensional (3D) stereoscopic image as well as a two-dimensional (2D) image without an additional output device.

However, the image projection apparatus 100 is not limited to this. That is, the image projection apparatus 100 may be also applicable to a projection apparatus mounted to a projection television, etc. Hereinafter, the image projection apparatus 100 according to the present invention will be explained with taking a projector as an example.

As shown, the image projection apparatus 100 is arranged close to a lower end (or upper end) of a screen (S), and is formed to project a large image onto the screen (S).

Figure 2A:
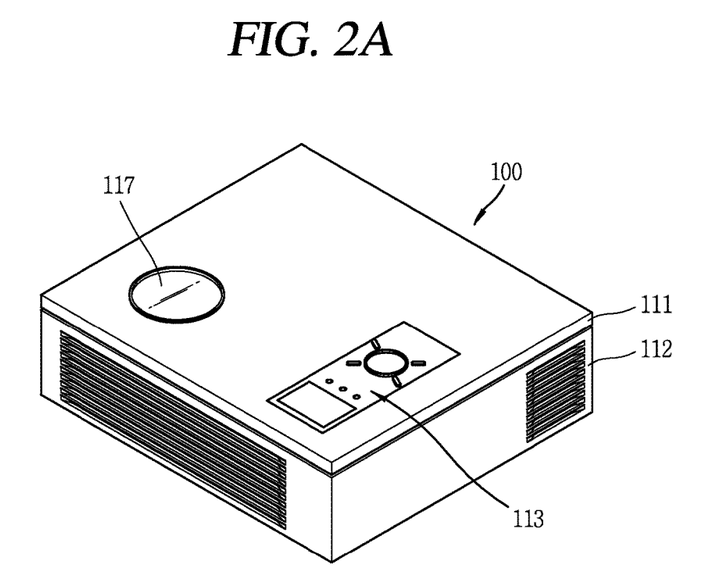
FIGS. 2A and 2B are perspective views of the image projection apparatus of FIG. 1, which are viewed from a front side and a rear side, respectively.
Figure 2B:
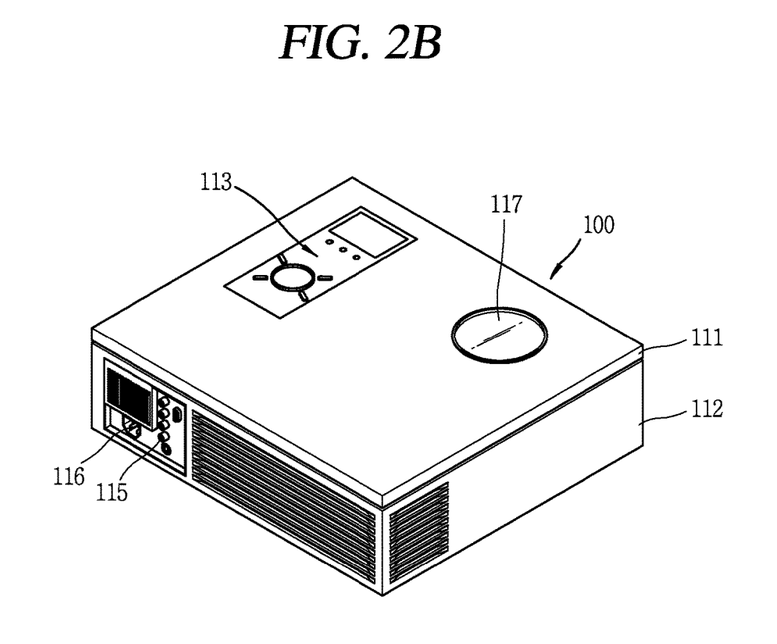

Hereinafter, the image projection apparatus will be explained with examples. FIGS. 2A and 2B are perspective views of the image projection apparatus 100 of FIG. 1, which are viewed from a front side and a rear side, respectively.

Components shown in FIGS. 2A and 2B are not absolutely required ones. That is, the image projection apparatus 100 may have more or fewer components than the components shown in FIGS. 2A and 2B.

Referring to the drawings, appearance of the image projection apparatus 100 is formed by an upper case 111 and a lower case 112. Various optical components and electronic components are mounted to a space formed by the upper case 111 and the lower case 112. At least one middle case may be disposed between the upper case 111 and the lower case 112.

A manipulating unit 113 may be arranged at the upper case 111. The manipulating unit 113 may adopt any method which allows a user to manipulate the manipulating unit 113 in a tactile manner.

A command for controlling an operation of the image projection apparatus 100 is applied to the manipulating unit 113. In a functional aspect, the manipulating unit 113 may be used to input menus such as 'START' and 'END'.

The manipulating unit 113 may be used to zoom-in or zoom-out an image projected from the image projection apparatus 100. Also, the manipulating unit 113 may be used to focus an image projected from the image projection apparatus 100.

An air flowing unit 114, an interface unit 115, a power supply unit 116, etc. may be arranged at the lower case 112.

The air flowing unit 114 is composed of a plurality of through holes, and is configured to allow air to flow into the image projection apparatus 100. With such a configuration, the image projection apparatus 100 can be cooled by using forced convection.

The interface unit 115 serves as a passage through which the image projection apparatus 100 exchanges data with an external device, etc. Data on an image to be projected by the image projection apparatus 100 may be received from outside through the interface unit 115. Referring to the drawings, the interface unit 115 includes a connection terminal electrically connectable to an electronic device which can supply image data or voice data, e.g., a computer, a digital video disc (DVD) player, etc.

The power supply unit 116 is mounted to the lower case 112 for supplying power to the image projection apparatus 100. The power supply unit 116 may be formed to receive an alternating current (AC) power (e.g., power for home), and to convert the AC power into a direct current (DC) power. However, the configuration of the power supply unit 116 is not limited to this. That is, the power supply unit 116 may be implemented as a chargeable battery which can be detachably mounted to the image projection apparatus 100 for charging, etc.

An audio output unit may be implemented at one of the upper case 111 and the lower case 112, in the form of a speaker. A broadcasting signal receiving antenna, etc. may be arranged at one of the upper case 111 and the lower case 112.

As shown, a projection unit 117 is formed to project an image to outside from an upper surface of the upper case 111. For instance, the projection unit 117 include a projection system 140 (or a projection optical system, refer to FIG. 3) where a plurality of lenses and a mirror are arranged at predetermined intervals. The projection unit 117 may be formed such that the intervals between the plurality of lenses and the mirror are controllable by the manipulation unit 113. With such a configuration, a zooming function or a focusing function of the image projection apparatus 100 may be implemented.

Hereinafter, an inner structure of the image projection apparatus 100, related to the projection system 140, will be explained in more detail with reference to FIGS. 3 to 5.

Figure 3:
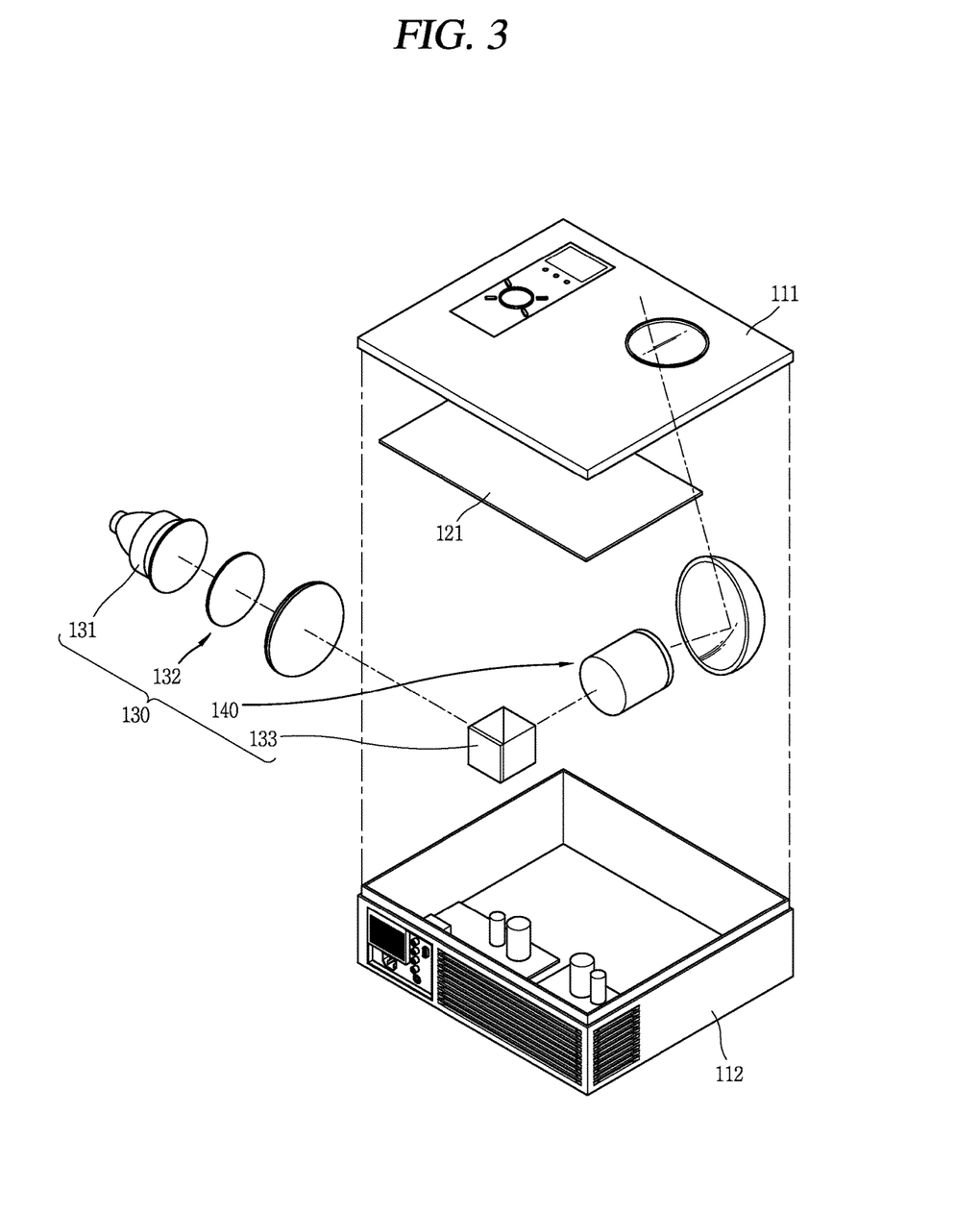
FIG. 3 is a disassembled perspective view of the image projection apparatus of FIG. 1.
Figure 4:
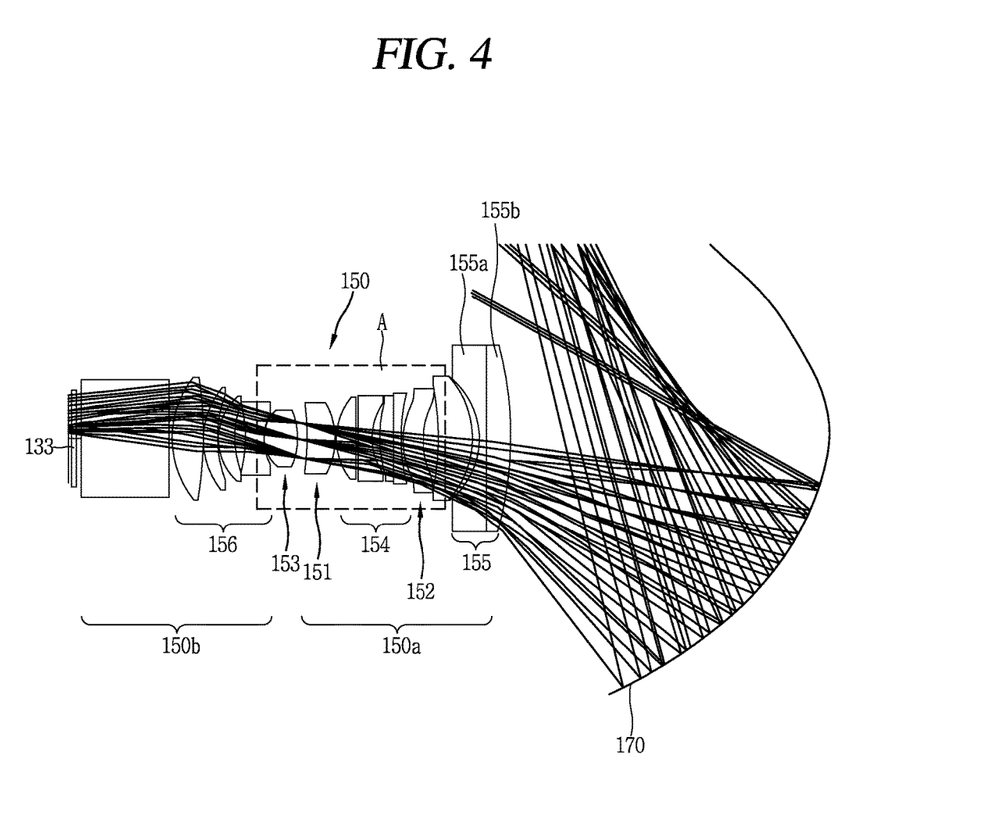
FIG. 4 is a conceptual view illustrating a path of a light bundle in a projection system of FIG. 3.
Figure 5:
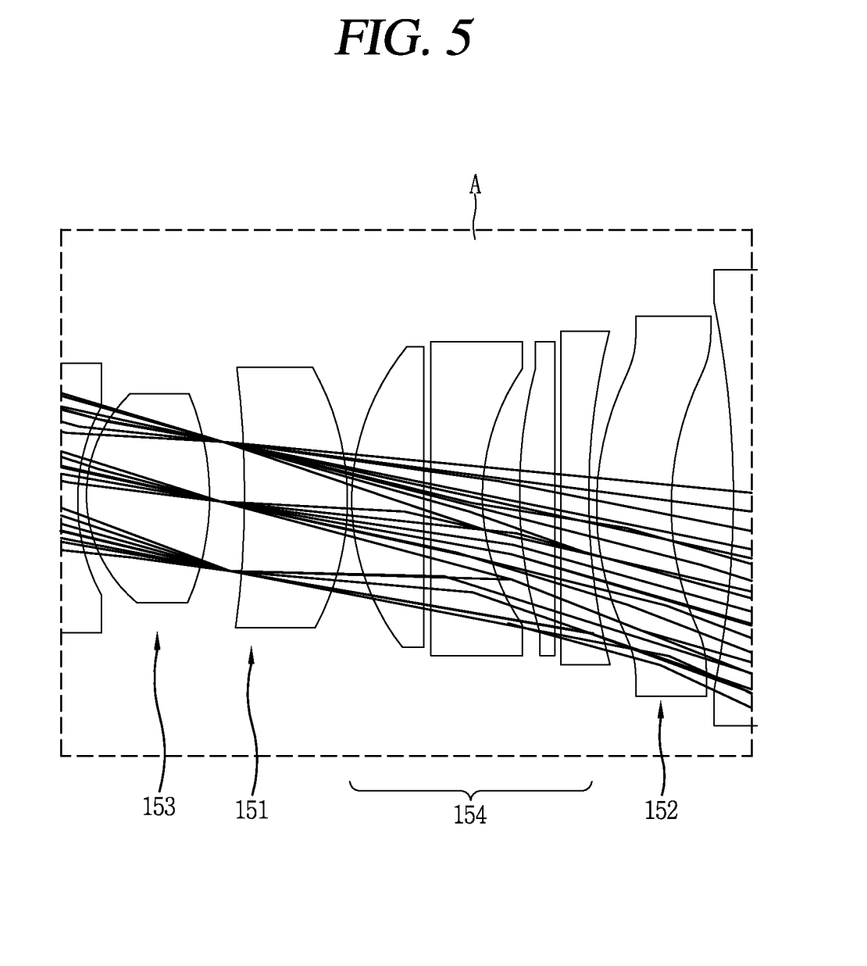
FIG. 5 is an enlarged view of part 'A' in FIG. 4.

FIG. 3 is a disassembled perspective view of the image projection apparatus of FIG. 1, FIG. 4 is a conceptual view illustrating a path of a light bundle in a projection system of FIG. 3, and FIG. 5 is an enlarged view of part 'A' in FIG. 4.

As shown, a printed circuit board 121 may be mounted to the lower case 112. The PCB 121 may be implemented as an example of a controller for performing various functions of the image projection apparatus 100.

An optical system 130 may be mounted to the lower case 112. The optical system 130 means a system of optical components, where a reflector, lenses, etc. are arranged so that the image projection apparatus 100 can implement an image of an object using reflection or refraction of light. A structure (not shown), to which the optical system 130 is assembled, may be additionally disposed between the optical system 130 and the lower case 112.

The optical system 130 includes a light source 131, an illumination system 132, a display device 133 and the projection system 140.

The light source 131 is configured to receive electric energy, to convert the electric energy into a light bundle energy, and thus to generate a light bundle. For instance, the light source may be implemented as an ultra-high voltage mercury lamp (UHV Lamp), a light emitting diode (LED), a laser diode (LD), etc.

A ballast stabilizer for stabilizing electricity supplied to the light source 131, a cooling fan for generating forced convection, etc. may be mounted to the lower case 112, for facilitation of the operation of the light source 131.

The illumination system 132 is configured to illuminate the light bundle generated from the light source 131 onto the display device 133. The display device 133 is configured to form an image using the light bundle. More specifically, the display device 133 may be implemented as a reflective display panel for implementing an image by reflecting the light bundle illuminated onto an incident surface thereof. Referring to the drawings, the incident surface of the display device 133 may have a quadrangular shape.

The display device 133 may be an electronic device controllable in a digital manner. The electronic device may include a plurality of micro mirrors which are drivable respectively. The plurality of micro mirrors reflect light independently, in correspondence to an image to be implemented. For instance, the electronic device may be a digital micro-mirror device (DMD) of which inclination angle is turned on according to a control signal. Alternatively, the electronic device may be a liquid crystal on silicon (LCOS) panel among liquid crystal display (LCD) devices, the LCOS panel for implementing an image by arranging a micro-mirror of which inclination angle is changed to an 'OFF' state, on a plane in the form of lattices, and then by reflecting light.

The projection system 140 is configured to project an image formed by the display device 133 in a magnified manner. Referring to FIGS. 4 and 5, the projection system 140 supports a full HD screen as a lens unit 150 and a mirror 170 are combined with each other. However, even if the projection system 140 supports a full HD screen, if an entire length of the projection system 140 is large, an entire size of the projector is increased. In the present invention, such problems can be solved through a shape of the lens unit 150.

For instance, the lens unit 150 is provided with a plurality of lenses which form a stop (diaphragm) between the display device 133 and the mirror 170. The plurality of lenses include spherical lenses and aspheric lenses, and the projection system 140 is arranged so that a central axis thereof can cross a center of each lens.

The lens unit 150 may include a first region 150a and a second region 150b based on the stop. The first region 150a is defined as a region adjacent to the mirror 170, and the second region 150b is defined as a region adjacent to the display device 133.

The first region 150a includes a first aspheric lens 151, a second aspheric lens 152, a first spherical lens group 154, and a second spherical lens group 155. The second region 150b includes a third aspheric lens 153 and a third spherical lens group 156. The first to third aspheric lenses 151, 152, 153, and the first to third spherical lens groups 154, 155, 156 may be consecutively arranged along a central axis of the projection system.

That is, the light bundle emitted from the display device 133 passes through the third spherical lens group 156 of the second region 150b, the third aspheric lens 153, the first aspheric lens 151 of the first region 150a, the first spherical lens group 154, the second aspheric lens 152, and the second spherical lens group 155, sequentially. The light bundle is refracted by a preset degree, and then reaches the mirror 170.

The mirror 170 reflects the refracted light bundle to outside, such that a large screen is implemented at a near distance. For this, the mirror 170 may be implemented as a concaved mirror.

Each of the first to third spherical lens groups 154, 155, 156 includes at least one spherical lens. The number of spherical lenses included in each spherical lens group is not limited to that shown in the drawings.

The light bundle emitted from the display device 133 is refracted by the third spherical lens group 156. The third spherical lens group 156 may be composed of a plurality of spherical lenses arranged along the central axis of the projection system.

For instance, as shown in FIG. 4, the third spherical lens group 156 may include 4 spherical lenses. Each of the spherical lenses may be formed to have a different direction and a different curvature, and an air layer due to a preset air gap may be formed between the spherical lenses.

A stop (diaphragm), by which the light bundle crosses the central axis of the projection system, is formed between the first aspheric lens 151 and the third aspheric lens 153, by the plurality of lenses of the lens unit 150.

The first to third aspheric lenses 151, 152, 153 reduce a spherical aberration, a phenomenon that an image is distorted and a focal point is a blur (defocus), by consecutively increasing or decreasing a surface refraction degree of a peripheral region of the aspheric lenses.

Firstly, the first aspheric lens 151 is formed to be convex toward the mirror 170, but to be concaved toward the display device 133. The first aspheric lens 151 may be implemented as a meniscus lens having two surfaces formed as curved surfaces processed in the same direction.

When a screen for outputting the image has a large size, the first aspheric lens 151 serves to compensate for a spherical aberration occurring as a lens aperture is increased. The spherical aberration can be compensated more efficiently as an aspheric lens is applied to the lens unit 150.

The third aspheric lens 153 may be implemented as a convex lens having a minus power value as two surfaces thereof are formed in a convex manner. A refraction efficiency of the light bundle can be enhanced by the third aspheric lens 153. An air gap may be formed between the first aspheric lens 151 and the third aspheric lens 153, in a preset size so that an air layer can be included.

The first aspheric lens 151 and the second aspheric lens 152 are spaced from each other in a state where the first spherical lens group 154 is disposed therebetween. The light bundle transmitted from the stop is refracted after passing through the first spherical lens group 154, and then is transmitted to the second aspheric lens 152.

The first spherical lens group 154 is composed of a plurality of spherical lenses. For instance, as shown, the first spherical lens group 154 may include 4 spherical lenses. The 4 spherical lenses may be formed to have different shapes. An air layer due to a preset air gap may be formed between the spherical lenses of the first spherical lens group 154.

The light bundle refracted by the first spherical lens group 154 reaches the second aspheric lens 152. The second aspheric lens 152 may be implemented as a meniscus lens having two surfaces formed to be convex toward the display device 133.

The light bundle refracted by the first aspheric lens 152 reaches the second spherical lens group 155. The light refracted by the second spherical lens group 155 is extended to a wider region, thereby being transmitted toward the mirror 170.

The second spherical lens group 155 may include a plurality of spherical lenses. As shown, the second spherical lens group 155 may include 3 spherical lenses. A size of the spherical lenses of the second spherical lens group 155 may be larger than that of other lenses of the lens unit 150, such that the light bundle is transmitted to a wider region.

A first spherical lens 155a and a second spherical lens 155b are arranged at an outermost region of the second spherical lens group 155. The first spherical lens 155a and the second spherical lens 155b are formed so that facing surfaces thereof can correspond to each other, substantially. The first spherical lens 155a and the second spherical lens 155b are formed as a cemented lens.

That is, the facing surfaces of the first spherical lens 155a and the second spherical lens 155b may be formed as flat surfaces. The surface of the second spherical lens 155b, which faces the mirror 170, may be implemented as a convex lens protruded toward the mirror 170. On the other hand, another surface of the first spherical lens 155a may be implemented as a concaved lens recessed.

That is, there is no gap between the first spherical lens 155a and the second spherical lens 155b. This can simplify manufacturing processes and management for production and arrangement of the first and second spherical lenses 155a, 155b.

The first to third aspheric lenses 151, 152, 153 may be formed of a glass molding material. The glass molding material may have high refractivity and low dispersion.

For instance, the first to third aspheric lenses 151, 152, 153 may be manufactured by being mounted to a ceramic mold (ceramic die) processed to include a preset shape (specific curvature radius).

The glass molding material, a material very resistant to heat, can minimize deformation of the image projection apparatus due to heat generated as the image projection apparatus is driven.

The first to third aspheric lenses 151, 152, 153 may be formed to have a size smaller than that of the first and second spherical lenses 155a, 155b which should be configured to emit a light bundle at a wide angle by being arranged between a plurality of spherical lenses of the lens unit 150. Thus, the first to third aspheric lenses 151, 152, 153 can be fabricated during a glass molding process which has a restriction on an effective size (about 30 Pi).

The glass molding has a molding type structure, and is fabricated by a pressure application process. A lens formed by the glass molding has its stress removed by undergoing an annealing process at a preset temperature for a preset time. Thus, a polarization characteristic of the lens formed by the glass molding can be maintained.

That is, the conventional problem, that a polarization characteristic of a plastic lens formed by an injection molding is not implemented due to an inner stress of the plastic lens, can be solved.

A polarization characteristic of a lens formed of a glass molding material is not deformed during fabrication processes of the lens. Thus, the first to third aspheric lenses 151, 152, 153 formed of a glass molding material maintain a polarization characteristic, even after being fabricated in a preset shape. Accordingly, the light bundle can be polarized by using the first to third aspheric lenses 151, 152, 153, and a three-dimensional (3D) stereoscopic image can be output using the polarized light bundle.

In the present invention, a stereoscopic image output device of a film-type patterned retarder type can be implemented without an additional dummy glass for polarizing a light bundle so as to output a stereoscopic image.

That is, the present invention can provide an image projection apparatus capable of outputting a stereoscopic image and enhancing durability, with an aspheric lens resistant to external heat and having a polarization characteristic.

Although not shown, an image projection apparatus according to another embodiment of the present invention may further include a dummy glass formed between the second spherical lens 155b and the mirror 170. The dummy glass may be implemented as a three-dimensional (3D) filter in case of outputting a stereoscopic image.

That is, when the first to third aspheric lenses 151, 152, 153 do not include a polarization characteristic, or when an additional compensation of a light bundle is required for implementation of a stereoscopic image, the image projection apparatus may further include the dummy glass. The dummy glass may be arranged to have an asymmetric structure based on the central axis of the projection system.

Figure 6:
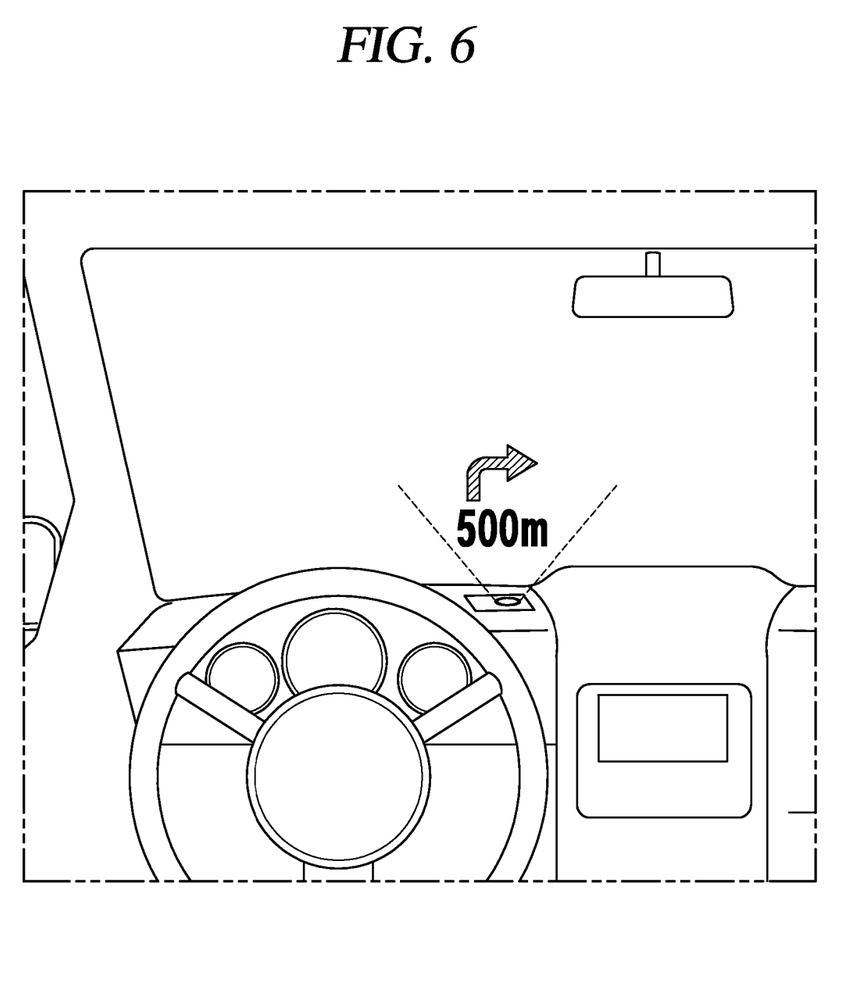
FIG. 6 is a conceptual view illustrating an image projection apparatus according to another embodiment of the present invention.

FIG. 6 is a conceptual view illustrating an image projection apparatus according to another embodiment of the present invention.

As shown, the image projection apparatus according to another embodiment of the present invention may be mounted to a vehicle, etc., as only an optical system is implemented as a single product. In this instance, the image projection apparatus may be configured to project a large image onto a front glass of the vehicle.

The image projection apparatus may be mounted to other commercial product such as a mobile terminal, a laptop computer, a personal digital assistant (PDA), a portable multimedia player (PMP) and a navigation, as only an optical system is mounted thereto separately. With such a configuration, the image projection apparatus may provide a projector function to the commercial product.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

In embodiments of the present invention, a refraction degree of the light bundle can be controlled by the lens unit including the aspheric lenses. Thus, the present invention can be applied to various industrial fields including the lens unit.

The invention claimed is:

1. An image projection apparatus, comprising:
a light source configured to emit a light bundle;
a display device configured to form an image using the light bundle; and
a projection system including a lens unit for refracting the light bundle so as to magnify and project the image, and a mirror for reflecting the light bundle delivered by the lens unit, wherein the lens unit includes:
a first aspheric lens configured to change a refraction degree of the light bundle;
a second aspheric lens spaced from the first aspheric lens and configured to change a refraction degree of the light bundle;
a third aspheric lens spaced from the first aspheric lens and the second aspheric lens, and configured to change a refraction degree of the light bundle;
a first spherical lens group disposed between the first aspheric lens and the second aspheric lens; and
a second spherical lens group disposed between the display device and the third aspheric lens,
wherein a stop, by which the light bundle crosses a central axis of the projection system, is formed between the third aspheric lens and the first aspheric lens,
wherein the lens unit is divided, by the stop, into a first region adjacent to the mirror and a second region adjacent to the light source,
wherein the first aspheric lens and the second aspheric lens are disposed at the first region,
wherein the third aspheric lens is disposed at the second region,
wherein the first aspheric lens has a polarization characteristic for polarizing the light bundle,
wherein the second aspheric lens has a polarization characteristic for polarizing the light bundle, and
wherein the image is a three-dimensional stereoscopic image.

2. The image projection apparatus of claim 1, wherein the third aspheric lens is an aspheric convex lens having two surfaces of different curvatures.

3. The image projection apparatus of claim 1, wherein the first aspheric lens is a meniscus lens,
wherein the second aspheric lens is a meniscus lens, and
wherein facing surfaces of the first aspheric lens and the second aspheric lens have curvatures of different directions.

4. The image projection apparatus of claim 1, wherein the first aspheric lens is formed of a glass molding material, and
wherein the second aspheric lens is formed of a glass molding material.

5. The image projection apparatus of claim 1, wherein the lens unit further includes:
a first spherical lens; and
a second spherical lens bonded to one surface of the first spherical lens and configured to emit the light bundle toward the mirror,
wherein the second spherical lens is formed such that an emitting surface for emitting the light bundle is a spherical surface.

6. The image projection apparatus of claim 5, wherein surfaces of the first spherical lens and the second spherical lens, which are bonded to each other, are flat surfaces.

7. The image projection apparatus of claim 5, wherein a diameter of the first aspheric lens and a diameter of the second aspheric lens are each smaller than a diameter of the first spherical lens and a diameter of second spherical lens.

8. The image projection apparatus of claim 1, wherein the first aspheric lens is formed of a glass molding material,
wherein the second aspheric lens is formed of a glass molding material,
wherein the first aspheric lens has a polarization characteristic for polarizing the light bundle, and
wherein the second aspheric lens has a polarization characteristic for polarizing the light bundle.

9. The image projection apparatus of claim 8, wherein the first aspheric lens is a meniscus lens,
wherein the second aspheric lens is a meniscus lens,
wherein facing surfaces of the first aspheric lens and the second aspheric lens have curvatures of different directions, and
wherein the third aspheric lens is an aspheric convex lens having two surfaces of different curvatures.

10. The image projection apparatus of claim 9, wherein the lens unit further includes:
a first spherical lens; and
a second spherical lens bonded to one surface of the first spherical lens and configured to emit the light bundle toward the mirror,
wherein the second spherical lens is formed such that an emitting surface for emitting the light bundle is a spherical surface.

11. An optical system, comprising:
a lens unit configured to refract a light bundle so as to magnify and project a stereoscopic image, the lens unit including a first aspheric lens and a second aspheric lens spaced from each other, the first aspheric lens and the second aspheric lens being formed of a glass molding material, and the first aspheric lens and the second aspheric lens having a preset polarization characteristic for outputting the stereoscopic image;
a second spherical lens bonded to one surface of the first spherical lens and configured to emit the light bundle toward the mirror,
wherein the second spherical lens is formed such that an emitting surface for emitting the light bundle is a spherical surface.

12. The optical system of claim 11, further comprising a third aspheric lens spaced from the first aspheric lens and the second aspheric lens, the third aspheric lens being formed of a glass molding material, and the third aspheric lens having a preset polarization characteristic for outputting the stereoscopic image.

13. The optical system of claim 12, wherein a stop, by which the light bundle crosses a central axis of the lens unit, is formed between the third aspheric lens and the first aspheric lens,
- wherein the lens unit is divided, by the stop, into a first region adjacent to the mirror and a second region adjacent to a light source configured to emit the light bundle,
- wherein the first aspheric lens and the second aspheric lens are disposed at the first region, and
- wherein the third aspheric lens is disposed at the second region.

14. The optical system of claim 12, wherein the third aspheric lens is an aspheric convex lens having two surfaces of different curvatures.

15. The optical system of claim 14, wherein the first aspheric lens is a meniscus lens,
- wherein the second aspheric lens is a meniscus lens, and
- wherein facing surfaces of the first aspheric lens and the second aspheric lens have curvatures of different directions.

16. The optical system of claim 11, wherein the lens unit further includes:
- a first spherical lens; and
- a second spherical lens bonded to one surface of the first sperical lens and configured to emit the light bundle toward the mirror,
- wherein the second spherical lens is formed such that an emitting surface for emitting the light bundle is a spherical surface.

17. The optical system of claim 16, wherein surfaces of the first spherical lens and the second spherical lens, which are bonded to each other, are flat surfaces.

18. The optical system of claim 16, wherein a diameter of the first aspheric lens and a diameter of the second aspheric lens are each smaller than a diameter of the first spherical lens and a diameter of second spherical lens.

19. The optical system of claim 11, wherein the first aspheric lens is a meniscus lens,
- wherein the second aspheric lens is a meniscus lens, and
- wherein facing surfaces of the first aspheric lens and the second aspheric lens have curvatures of different directions;
- at least one spherical lens disposed between the first aspheric lens and the second aspheric lens, the at least one spherical lens configured to refract the light bundle; and
- a mirror configured to reflect the light bundle delivered by the lens unit.

* * * * *